(12) United States Patent
Woods

(10) Patent No.: US 6,386,402 B1
(45) Date of Patent: May 14, 2002

(54) AQUEOUS QUICK DRY SPRAYABLE DRYWALL TEXTURE

(75) Inventor: John R. Woods, Woodland Hills, CA (US)

(73) Assignee: Spraytex, Inc., Valencia, CA (US)

( * ) Notice: Subject to any disclaimer, the term of this patent is extended or adjusted under 35 U.S.C. 154(b) by 0 days.

(21) Appl. No.: 09/536,218

(22) Filed: Mar. 27, 2000

(51) Int. Cl.$^7$ .............................................. B65D 83/00
(52) U.S. Cl. .................... 222/394; 222/402.1
(58) Field of Search .............................. 222/394, 402.1

(56) References Cited

U.S. PATENT DOCUMENTS

| | | |
|---|---|---|
| 5,219,609 A | 6/1993 | Owens |
| 5,505,344 A * | 4/1996 | Woods ..................... 222/394 |
| 5,891,282 A | 4/1999 | Stough et al. |
| 5,921,446 A | 7/1999 | Stern |
| 5,925,204 A | 7/1999 | Hoffmann, Sr. |
| 5,934,518 A | 8/1999 | Stern et al. |
| 5,967,426 A | 10/1999 | McLeod |
| 6,000,583 A | 12/1999 | Stern et al. |

* cited by examiner

Primary Examiner—Philippe Derakshani
(74) Attorney, Agent, or Firm—Pillsbury Winthrop LLP

(57) ABSTRACT

An aqueous quick dry sprayable drywall texture material in the form of a sprayable composition includes an aqueous base, a filler and a polymer. The aqueous quick dry sprayable drywall texture is storable and dispensable from a pressurized dispenser having a delivery nozzle or other spray dispensing device. An aerosol system with a spray nozzle is included on the container for selective discharge of the textured material onto a prepared patch area or other substrate so as to match and blend with the surrounding drywall area in order to provide a continuous and unbroken coextensive surface texture of mechanically and visually matched material.

4 Claims, 2 Drawing Sheets

AQUEOUS QUICK DRY SPRAYABLE DRYWALL TEXTURE

BACKGROUND OF THE INVENTION

The present invention relates to surface texture materials, and more particularly to a novel pressurized substance in liquid or semi-liquid form that is storable and dispensable from an air-tight pressurized container to be sprayed onto a drywall or other supporting surface so that after subsequent curing and hardening, a matching surface texture is provided with that of the surrounding drywall.

It has been conventional practice in the procedure of repairing or patching drywall to remove the damaged portion and subsequently fill any holes, depressions or the like with a prepared patch material. The patch or replacement material is applied by means of a trowel or other flat tool that will press the patch material into the hole or depression and that will prepare and provide a surface area to receive a finish surface coating. After the patch material has cured and adhered to the original support material, a smooth surface is provided that receives the final coating. This coating leaves a smooth surface that is not matched to the surrounding roughened or textured surface.

A drywall surface usually presents a surface texture that has a very slightly roughened texture. It is generally plaster-like. Such an appearance and surface texture cannot be attained through the use of smoothing tools or patch tools once the patch material has been applied to the damaged or repaired area. Therefore, difficulties and problems have been encountered that stem largely from the fact that the use and application of conventional patching materials on drywall leaves a surface texture that does not match the surrounding area and is noticeable after the repair has been completed.

U.S. Pat. Nos. 5,921,466, to Stern, and U.S. Pat. No. 6,000,583, to Stern, et al., disclose an apparatus and method by which spray texturing can be accomplished by providing spray patterns of varying texture. In the above referenced patents, the additional step of changing the particle size by adjusting a cross-sectional area of the outlet through which the texture material passes as it is dispensed is required to vary the texture.

Like other aerosol patents, the solvent disclosed in the above-referenced patents is desirably aromatic and/or aliphatic hydrocarbons, ketones, etc. Aromatic and aliphatic hydrocarbons, like xylene or tolulene often have noxious and toxic fumes. They additionally may present health and environmental concerns.

Therefore, there is a need for a sprayable drywall texture material that may be applied to a repaired or patched area, and that may be contained in a hand-held applicator and dispensed using only one hand, so that the material may be conveniently stored as well as applied to the required area in a simple and convenient manner.

SUMMARY OF THE INVENTION

An object of an embodiment of the present invention is to provide a drywall texture spray material that does not use harmful chemicals such as xylene, methyl ethyl ketone (MEK) or other volatile organic compounds. Such an embodiment of the present invention provides fewer noxious odors and decreased health and environmental risks.

Another object of an embodiment of the present invention is to provide drywall texture spray that is more environmentally friendly than the sprays that are the current state of the art.

Another object of an embodiment of the present invention is to provide a drywall texture spray material that has decreased drying time, yet does not contain xylene, methyl ethyl ketone (MEK) or other harmful volatile organic compounds.

Another object of an embodiment of the present invention is to provide a drywall texture spray that is easier to clean than those which use xylene, methyl ethyl ketone (MEK) or other volatile organic compounds. The present invention is water based and cleans with water. Therefore, it is easier to clean up than other sprays, which may require other compounds to clean up or remove the spray.

Accordingly the above problems and difficulties are obviated by the present invention, which provides a novel material that is storable and dispensible from a convenient dispenser including a pressurized container holding a quantity of the drywall surface texture material in a liquid or semi-liquid condition so that upon depression of a dispensing nozzle, the material will be discharged and directed to a patch area or seam intended to receive the surface texture material. The hardenable, flowable material includes a liquid base, a polymer and a filler. The hardenable, flowable material may also be dispensed by traditional spraying mechanisms as are known in the art. The hardenable flowable material may also include a fungicide to prevent the growth of mold or mildew.

In an embodiment of the present invention, the drywall textured material may include: a base or emulsion that is primarily water; a polymer; a pressurized carrier for dispensing of the material; and a fillers such as clay or calcium carbonate.

DESCRIPTION OF THE PREFERRED EMBODIMENT

Figure 4A:
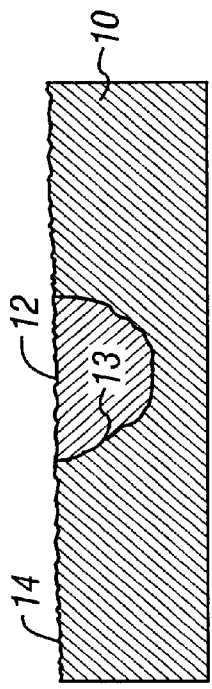
FIGS. 4a and 4b illustrate a transverse cross-sectional view of the repaired or patched area on a piece of drywall and shows matching of surface texture between the surface of the patch and the surrounding drywall surface after use of the novel spray-on surface textured material of the present invention.
Figure 3A:
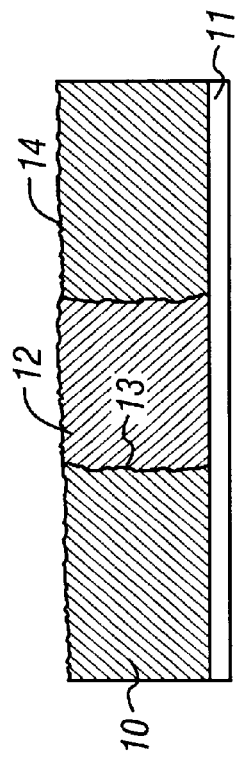
FIGS. 3a and 3b illustrate a transverse cross-sectional view of the repaired or patched area shown in FIG. 1 showing the dissimilarity in surface texture between the original drywall surface and the surface of the patched areas.
Figure 4B:
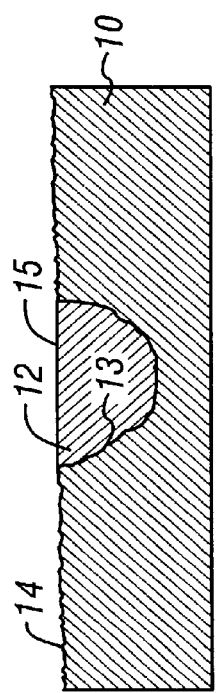
Figure 6:
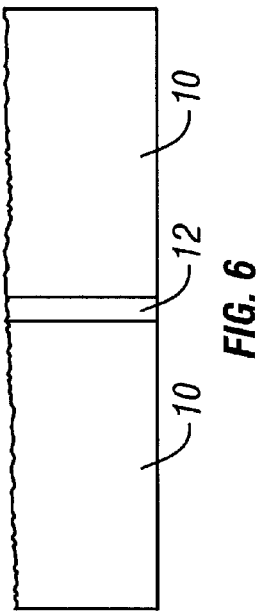
FIG. 6 illustrates a transverse cross-sectional view of the patched seam between the two pieces of drywall showing the matching of surface texture between the surface of the patched seam and the surrounding drywall surface.
Figure 5:
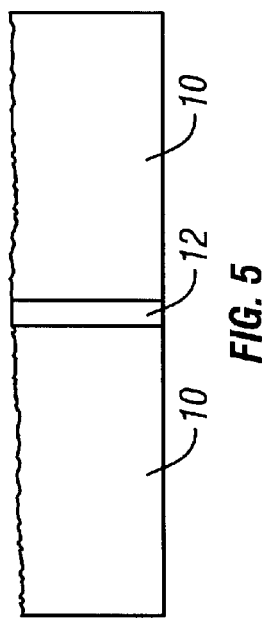
FIG. 5 illustrates a transverse cross-sectional view of the patched seam shown in FIG. 2 showing the dissimilarity in surface texture between the two drywall surfaces and the surface of the patched seam.

Referring in detail to FIGS. 3a and 4a, a fragmentary view is shown of a typical piece of drywall and is identified by the number 10. In FIGS. 4a and 4b, it is shown that the drywall panel 10 may be supported by boards or other means of support 11. The drywall has been damaged and a repair to the damaged area has been performed in the form of a patch 12. Alternatively, as in FIGS. 5 and 6, the patch 12 can be applied to a seam between two pieces of drywall 10.

After curing, the patch becomes solidified and adheres to the edge marginal region of support material 11 or the edge marginal region of damaged area 13. The surface area of the drywall 14 can be seen to be broadly defined as being slightly roughened.

Figure 3B:
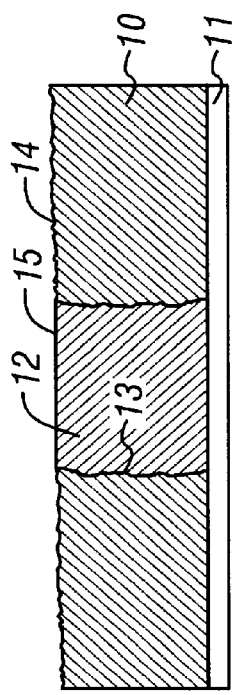

In FIGS. 3a and 3b, it can be seen that the patch 12 displays a smooth surface 15 usually attained by repeatedly drawing the edge of a hand tool, such as a trowel, across the surface. After drying or curing, the material of the patch 12 becomes hard and the surface 15 remains smooth and unmatched with the surrounding slightly roughened surface 14 carried on the drywall panel 10. Although the surface 15 will accept a variety of coatings such as paint or the like in a conventional situation, the surface texture of the coating will not simulate or blend with the surrounding irregular surface 14 of original material 10. Visually, flat patch area 15 will always be noticeable and indicate the presence of a repair.

Figure 1:
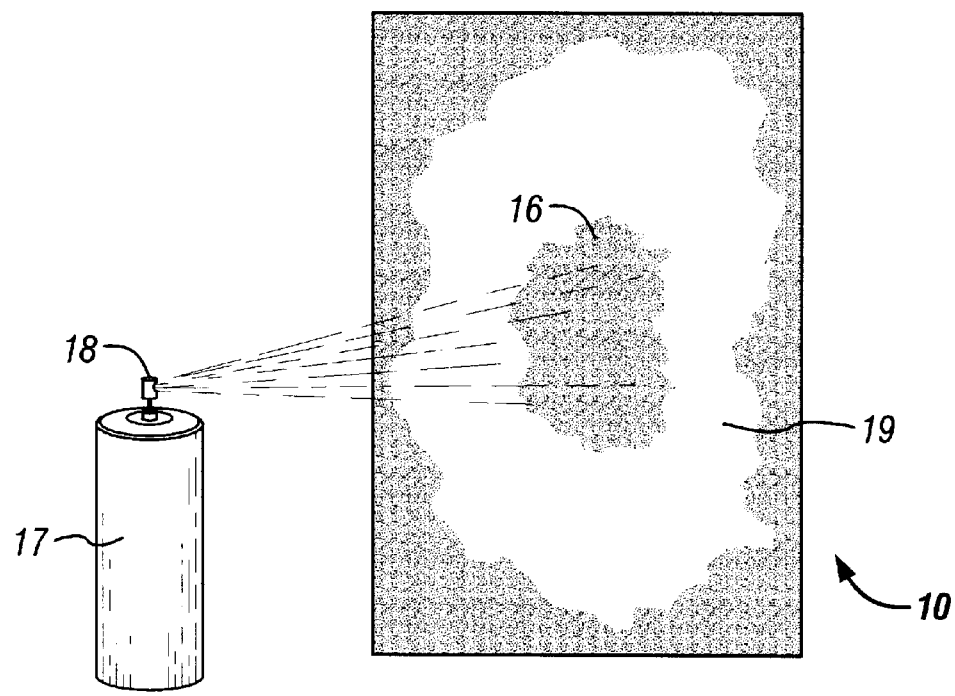
FIG. 1 illustrates the direct application of the spray-on surface texture material from the dispenser for repairing of a piece of drywall in accordance with an embodiment of the present invention.

Referring now in detail to FIGS. 1, 4a and 4b, the surface textured material 16 discharged from a dispenser 17 is illustrated as being applied to the smooth surface 15 of patch 12. In this connection, a slightly roughened surface is placed on the flat surface 15 so as to be compatible with, blend with and be coextensive with the surrounding surface area 14. By employment of the present invention, the surface texture of both the patch 12 and the surrounding drywall material 10 are substantially identical and matched so that no visual indication is presented or noticeable pertaining to a repair or patch. The material being applied is broadly indicated by numeral 16 which is contained within the dispenser 17 and applied in the form of a spray in either liquid or semi-liquid condition.

In one embodiment of the present invention, application is achieved by depression of a pump or spray nozzle which permits discharge of the pressurized material carried within the container 17. Such an application of the material occurs directly on the desired area 19 by the user who hand-carries the container 17 and operates the nozzle 18 on the site with one hand. Waste and loss of material is avoided since the discharge is under the control of the user through the application of the discharge nozzle 18. Therefore, there is no residue or excess material that is not used which requires disposal. Furthermore, the material 16 is slightly lumpy and, after curing on surface 15, provides an irregular surface that is slightly roughened and compatible and matching the surrounding material surface area. Additionally, the material in the container is considered a finished product and does not require additives of any kind. The labeling on the container may provide identification numbers and laboratory information.

In an alternate embodiment of the present invention, the quick-dry aqueous material may be applied through the use of traditional spray dispensers as are known in the art.

Preferably, an example of the material 16 comprises an aqueous base, filler, a polymer and a small amount of acetone. The filler may be calcium carbonate, clay or similar materials, or mixtures thereof. The acetone, which provides few noxious fumes and has low toxicity, may serve to facilitate an even spray and quick drying.

By way of an example, the hardenable flowable material 16 of the present invention may have the following composition by percentage weight:

| | |
|---|---|
| Liquid Base | 20–60% |
| Filler | 37–77% |
| Natural or Synthetic Polymer | 3–10% |

Also by way of a more specific example, the hardenable flowable material 16 of the present invention may have the following basic composition by percentage weight:

| | |
|---|---|
| Water | 20–55% |
| Calcium Carbonate and/or clay | 37–77% |
| Polyvinalalcohol acrylic | 3–10% |
| Acetone | At least 5% |

The calcium carbonate of the filler is preferably in powder form. Furthermore, the composition of material 16, as described directly above, may contain a fungicide (0.05–5%).

Figure 2:
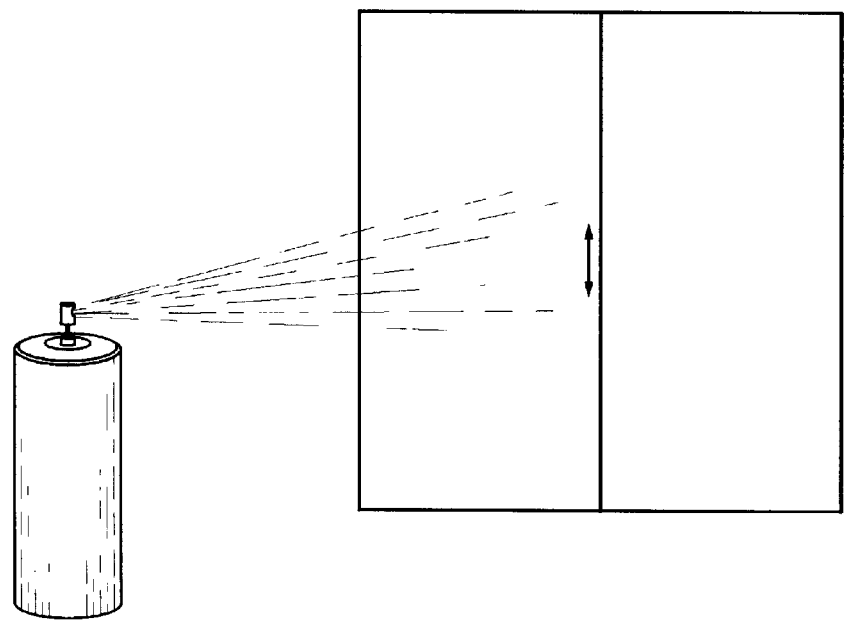
FIG. 2 illustrates the direct application of the spray-on surface texture material from the dispenser for the patching or smoothing of a seam between two pieces of drywall in accordance with an embodiment of the present.

As illustrated in FIGS. 1 and 2, the material 16 is applied directly to the smooth surface 15 and when dried or cured results in a slightly roughened surface having a texture compatible and matched with the surrounding surface texture of the drywall. The patch material 12 is dried and cured in preparation for receiving the material 16. Even if small amounts of the material extend beyond the surface 15 onto the surrounding material, the surface would still be matched and no unsightly patch edges or dissimilar surface texture would be detectable.

The product of the present invention is water-based. This provides for easier cleanup in the situation where the material is sprayed inaccurately. The composition of the present invention also provides for a decreased drying time of drywall texture spray while avoiding the use of harmful or toxic chemicals, like aromatic or aliphatic hydrocarbons.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A system for dispensing a hardenable flowable substance for application to a patch surface surrounded by drywall to form a layer of textured patch material on the patch surface, the system comprising:
   a fluid-tight, pressurized container, in which the hardenable flowable substance is stored; and
   an actuator on the fluid-tight container for selectively releasing the hardenable flowable substance in the form of an aerosol spray,
   wherein said hardenable substance consists essentially of:
      20–60% by weight liquid base wherein the liquid base consists essentially of water and acetone,
      37–77% by weight filler wherein the filler consists essentially of calcium carbonate and clay, 3–10% natural or synthetic polymer wherein the polymer consists essentially of polyvinyl alcohol polymer, and wherein the hardenable flowable substance forms a slightly roughened surface texture that matches and is compatible with the dry wall material surrounding the patch.

2. The system for dispensing the hardenable flowable substance according to claim 1, the hardenable flowable substance further comprising:

a fungicide.

3. The system for dispensing the hardenable flowable substance according to claim 2, wherein the fungicide has a composition by percentage weight of 0.05–5%.

4. The system for dispensing the hardenable flowable substance according to claim 1, wherein the liquid base has the following composition by percentage weight:

20–55% water; and at least 5% acetone.

* * * * *